United States Patent
Winand et al.

(10) Patent No.: US 9,292,061 B2
(45) Date of Patent: Mar. 22, 2016

(54) DETACHABLE FUEL CARTRIDGE DEFINING THE BASE OF A COMPUTER PERIPHERAL DEVICE TO SUPPLY FUEL TO A FUEL CELL FOR POWERING A COMPUTER APPARATUS

(71) Applicants: Henri Winand, Loughborough (GB); Peter David Hood, Loughborough (GB); Kevin Kupcho, Loughborough (GB)

(72) Inventors: Henri Winand, Loughborough (GB); Peter David Hood, Loughborough (GB); Kevin Kupcho, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 348 days.

(21) Appl. No.: 13/632,894

(22) Filed: Oct. 1, 2012

(65) Prior Publication Data

US 2014/0095898 A1    Apr. 3, 2014

Related U.S. Application Data

(60) Provisional application No. 61/549,492, filed on Oct. 20, 2011.

(51) Int. Cl.
| | |
|---|---|
| *G06F 1/00* | (2006.01) |
| *G06F 1/26* | (2006.01) |
| *G06F 1/32* | (2006.01) |
| *G06F 3/0354* | (2013.01) |

(52) U.S. Cl.
CPC ........ *G06F 1/26* (2013.01); *G06F 1/263* (2013.01); *G06F 1/3203* (2013.01); *G06F 3/03543* (2013.01); *G06F 1/266* (2013.01)

(58) Field of Classification Search
CPC ......... G06F 1/3203; G06F 1/26; G06F 1/266; G06F 3/03543
See application file for complete search history.

(56) References Cited

U.S. PATENT DOCUMENTS

| | | | | |
|---|---|---|---|---|
| 7,447,922 B1 | * | 11/2008 | Asbury et al. | 713/300 |
| 2005/0001819 A1 | * | 1/2005 | DePue | G06F 3/03543 345/166 |
| 2006/0228599 A1 | | 10/2006 | Takaiwa | |
| 2007/0015551 A1 | * | 1/2007 | Iwama et al. | 455/575.3 |
| 2007/0020493 A1 | * | 1/2007 | Ninomiya | 429/22 |
| 2007/0059578 A1 | | 3/2007 | Kweon | |
| 2007/0132733 A1 | | 6/2007 | Ram | |
| 2009/0128087 A1 | * | 5/2009 | Ohmori | 320/101 |
| 2010/0248082 A1 | | 9/2010 | Minamiura | |
| 2010/0265179 A1 | * | 10/2010 | Ram | 345/163 |
| 2011/0248665 A1 | * | 10/2011 | Smith et al. | 320/101 |
| 2011/0313589 A1 | * | 12/2011 | Iyer et al. | 700/297 |

OTHER PUBLICATIONS

International Patent Application No. PCT/GB2012/052573; Int'l Search Report; dated Mar. 7, 2013; 4 pages.

* cited by examiner

*Primary Examiner* — Mohammed Rehman
*Assistant Examiner* — Gayathri Sampath
(74) *Attorney, Agent, or Firm* — Baker Hostetler LLP; Mark H. Krietzman

(57) ABSTRACT

A computer peripheral device incorporates a fuel cell that may be used to supply power to a computer device coupled to the peripheral device. The peripheral device comprises a housing and circuitry within the housing to provide at least one computer peripheral function. A data interface provides for data transfer to and/or from a computer device. A fuel cell power source is incorporated into the peripheral device. A power interface provides power transfer to the computer device when connected thereto. A power controller is configured to supply power from the fuel cell power source to the power interface for supplying said power to said computer device when connected thereto.

9 Claims, 7 Drawing Sheets

DETACHABLE FUEL CARTRIDGE DEFINING THE BASE OF A COMPUTER PERIPHERAL DEVICE TO SUPPLY FUEL TO A FUEL CELL FOR POWERING A COMPUTER APPARATUS

CROSS-REFERENCE TO RELATED APPLICATIONS

This application claims full Paris Convention Priority of U.S. Provisional Application No. 61/549,492, entitled "Fuel Cell for Powering Computer Apparatus," filed on Oct. 20, 2011, the contents of which is incorporated by reference herein, as if fully set forth in its entirety.

OBJECTS AND SUMMARY OF THE INVENTIONS

The present invention relates to fuel cell power systems and in particular to the use of fuel cells to provide power to computer hardware.

Portable personal computing, data processing and/or telecommunications devices are known to have significant limitations in the duration of their battery life. In this patent specification, the expressions "portable computer system" or "portable computer device" are intended to encompass all such data processing devices including lap-tops, netbooks, palm computers, tablet computers, personal organizers, 'smart phones' and the like.

Significant efforts have been made in recent years to extend the period for which these battery-powered, computer-based devices can operate independently of a mains power supply. Typically, extending the period of independence from a mains power supply requires improvements in battery technology, increased battery size or substitute battery packs. Each of these solutions can increase cost, weight and/or size of the equipment to be carried and thereby increase inconvenience to the user. In addition, there are still significant limitations in the energy density achievable with battery power.

More recently, fuel cells have been recognized as a potential alternative portable power supply for computing devices. However, integration of fuel cells into portable computer devices themselves may not always be convenient, and also does not address how to extend the battery life of existing hardware into which a fuel cell cannot conveniently be integrated or retrofitted.

It is an object of the present invention to provide an alternative approach to powering portable computer devices by way of a fuel cell.

According to one aspect, the present invention provides a computer peripheral device comprising: a housing; circuitry within the housing to provide at least one computer peripheral function; a data interface for providing data transfer to and/or from a computer device; a fuel cell power source incorporated into the peripheral device; a power interface for providing power transfer to the computer device when connected thereto; a power controller configured to supply power from the fuel cell power source to the power interface for supplying said power to said computer device when connected thereto.

According to another aspect, the present invention provides a computer peripheral device for coupling to a computer system, the computer peripheral device having: a housing; circuitry within the housing for performing at least one computer peripheral function when connected to a computer system; and a fuel cell disposed within the housing; wherein at least an external portion of the housing comprises a detachable fuel cartridge for supplying fuel to the fuel cell.

The computer peripheral device may comprise any of a mouse, a printer, a scanner, a keyboard, a projector, a docking station/stand. The data interface and power interface may comprise a USB interface. The computer peripheral device may include a controller configured to control operation of the fuel cell power source according to instructions received from the computer device via said data interface. The computer peripheral device may include a detachable fuel cartridge coupled to the housing. The detachable fuel cartridge may comprise the base of the device. Where the computer peripheral device is a mouse, the mouse may include: position sensing means for sensing changes in position of the mouse relative to a support surface on which the mouse is to be used, in which the base of the mouse comprises said detachable fuel cartridge, the cartridge including a lower surface for sliding engagement with said support surface, the cartridge including at least one aperture in the cartridge through which the position sensing means operates. The cartridge may include low friction pads on the lower surface thereof. Where the computer peripheral device comprises a keyboard, the base of the keyboard may comprise the detachable fuel cartridge, the cartridge including a lower surface for engagement with a support surface on which the keyboard is to be used, the cartridge configured as an adjustable support for the keyboard when in use.

According to another aspect, the present invention provides a stand/docking station for a computer device, the stand/docking station having: a housing configured to engage with the computer device to present the computer device at one or more specific angles of presentation; a fuel cell power source disposed within the housing; a power interface for providing power transfer to the computer device when connected thereto; and a power controller configured to supply power from the fuel cell power source to the power interface for supplying said power to said computer device when connected thereto.

The indication that the fuel cell is disposed with the peripheral device housing, or within the stand/docking station housing, is intended to encompass embodiments in which at least parts of the fuel cell may form at least a part of the housing itself, e.g. that the fuel cell is integrated into the housing.

BRIEF DESCRIPTION OF THE DRAWINGS

Embodiments of the present invention will now be described by way of example and with reference to the accompanying drawings in which:

FIG. 1 shows a computer mouse incorporating a fuel cell in which FIG. 1a shows a forward end view, FIG. 1b shows a left side view, FIG. 1c shows a plan view, FIG. 1d shows a lower side perspective view and FIG. 1e shows an upper side perspective view;

FIG. 2 shows a fuel cartridge used in the mouse of FIG. 1, in which FIG. 2a shows a forward end view, FIG. 2b shows a left side view, FIG. 2c shows a plan view and FIG. 2d shows an upper side perspective view;

DETAILED DESCRIPTION OF THE INVENTION

In one aspect, the present invention recognizes that many users of portable computer devices also use such computer devices in combination with one or more peripheral devices such as a mouse, a keyboard, a printer, a scanner, a projector, a docking station/stand and the like. These peripheral devices themselves may also be portable and can be constructed to have incorporated within them a fuel cell system capable of powering not only the peripheral device itself, but also a portable computer device when connected to the peripheral device. The expression 'peripheral device' is intended to encompass devices that perform a data input and/or output function to the computer device to which they are electronically attached, and which are physically separate or separable from the computer device to which they are electronically attached.

Figure 1:
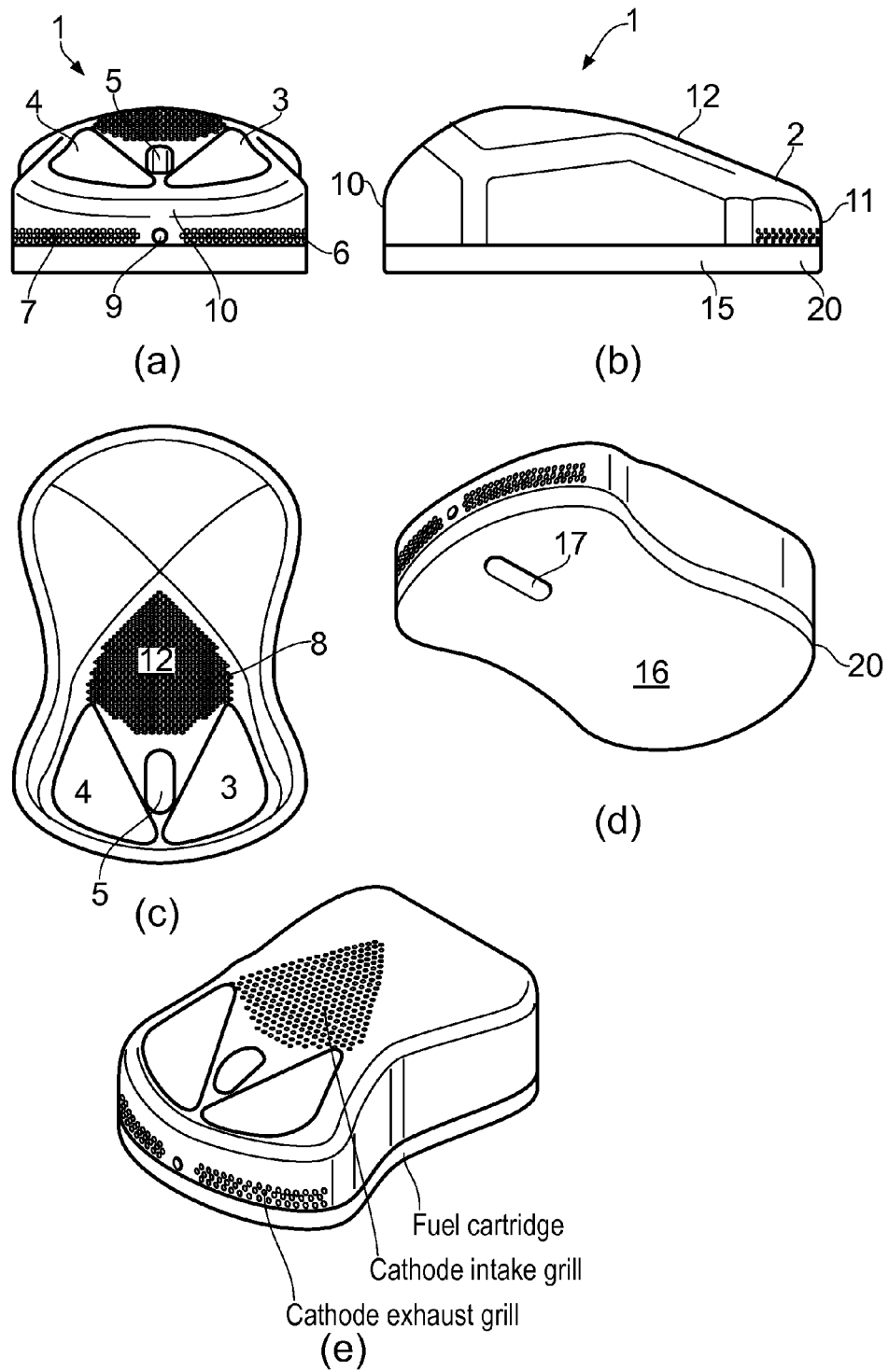

FIG. 1 shows an exemplary computer mouse 1 in which a fuel cell system is incorporated. The computer mouse 1 includes an upper housing portion 2 which encases conventional mechanical and electronic hardware for performing the conventional mouse functionality of providing an electrical output indicative of changing position of the mouse relative to a support surface on which the mouse is to be used, e.g. a mouse mat, table top etc. The upper housing portion includes a set of conventional mouse buttons such as the left and right buttons 3 and 4. The mouse may also include a conventional scroll wheel 5, together with any other control switches, buttons, or other control surfaces as known in the art.

Figure 3:
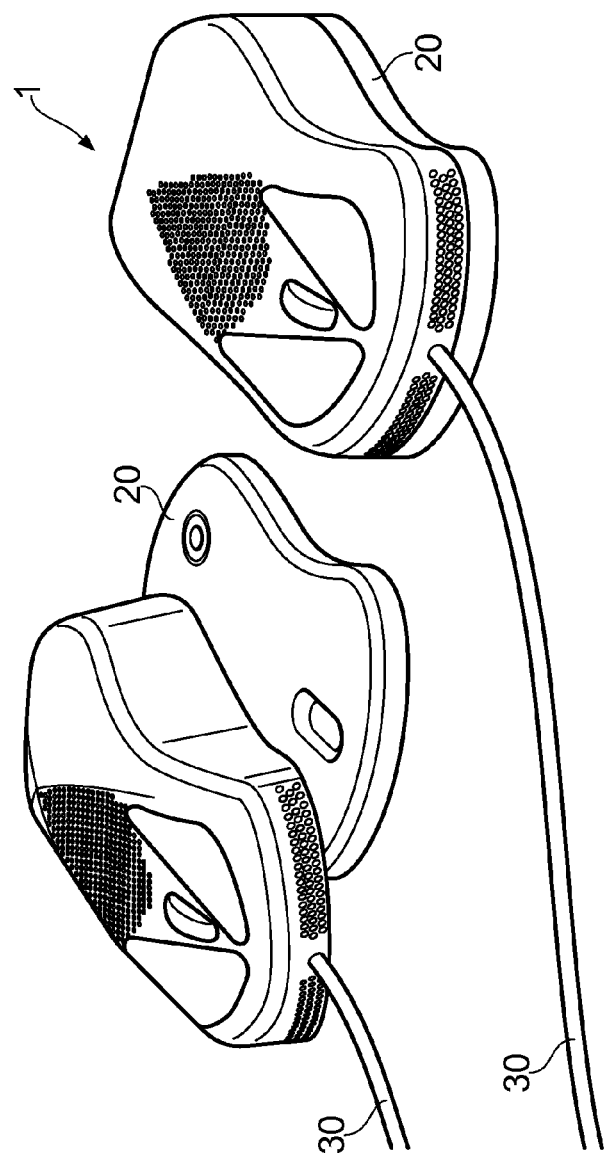
FIG. 3 shows a perspective view of the mouse of FIG. 1 showing the fuel cartridge in both disconnected and connected configurations.

Incorporated within the upper housing portion 2 is a fuel cell (not visible in FIG. 1). The fuel cell may be of any suitable type capable of providing an electrical power output at an appropriate voltage. A typical requirement would be for a 5 V power output of up to several amps current, although higher or lower specifications can be considered. The upper housing portion 2 also includes a number of ventilation hole arrays 6, 7 and 8 to provide ventilation to the fuel cell, e.g. an air source to the cathode side of a fuel cell. These ventilation hole arrays are preferably positioned on the upper housing portion 2 in positions where there is reduced likelihood that they will be occluded by a user's hand during normal operation of the mouse. As shown in FIG. 1, preferred positions for the ventilation hole arrays 6, 7, 8 include forward positions indicated by hole arrays 6 and 7 on a forward surface 10 of the housing close to where the mouse lead would ordinarily emerge, indicated by lead aperture 9 in FIG. 1a. The lead itself is not shown for clarity in FIG. 1 but is seen in FIG. 3. These forward positions of arrays 6 and 7 are typically well forward of the ends of the fingers of a user of the mouse. Another preferred position is that shown for the ventilation hole array 8 on the forwardly sloping upper surface 12 of the mouse, to the rear of the buttons 3, 4. The positioning of the ventilation hole array 8 is such that the user's palm and fingers tend to arch over the array without occluding it.

Comfort of the user of a computer mouse is an important consideration in mouse design and the profile of the upper housing portion 2 can be configured to any suitable profile to optimize the ergonomics. In a preferred configuration, the ventilation hole arrays 6 and 7 at the forward end of the mouse are configured as the exhaust vents of the fuel cell while the ventilation hole array 8 can be configured as the air inlet for the fuel cell. In this way, the warm air stream from the fuel cell during operation can be vectored away from the user's hand.

The base 15 of the mouse 1 preferably provides a substantially planar lower surface 16 which is configured for sliding engagement with the support surface on which the mouse is to be used, e.g. mouse mat, table top and the like. The lower surface 16 may have any suitable profile (preferably, though not necessarily planar, e.g. concave upwards), and may be provided with low friction coatings such as Teflon pads (not shown) for optimized sliding motion. The base 15 also serves as a removable fuel cartridge 20 to supply the fuel cell with any suitable fluid fuel. The fuel may be stored in the cartridge in solid, liquid or gaseous form but is preferably delivered to the fuel cell in fluid form, e.g. gaseous or liquid form. Exemplary fluid fuels include hydrogen.

The fuel cartridge 20 is preferably configured to be integrated into the overall profile of the mouse housing, though preferably detachable to enable easy fuel replenishment and cartridge refilling. In the arrangement shown in FIG. 1, because the fuel cartridge 20 defines the base 15 of the mouse, an aperture 17 is formed through the cartridge 20 to enable a conventional optical position tracker system to interact with the support surface (e.g. mouse mat) on which the mouse is disposed, in accordance with known designs of optical mice. The aperture 17 may be configured as a physical aperture right through the cartridge 20, such that the fuel containment volume of the cartridge may be considered as somewhat toroidal (e.g. 'ring' or 'doughnut' shaped). Alternatively, the aperture may be an optical aperture such as a window through the cartridge 20. The aperture 17 may alternatively be configured to receive a mechanical arrangement such as a tracking ball for conventional position sensing.

Figure 2:
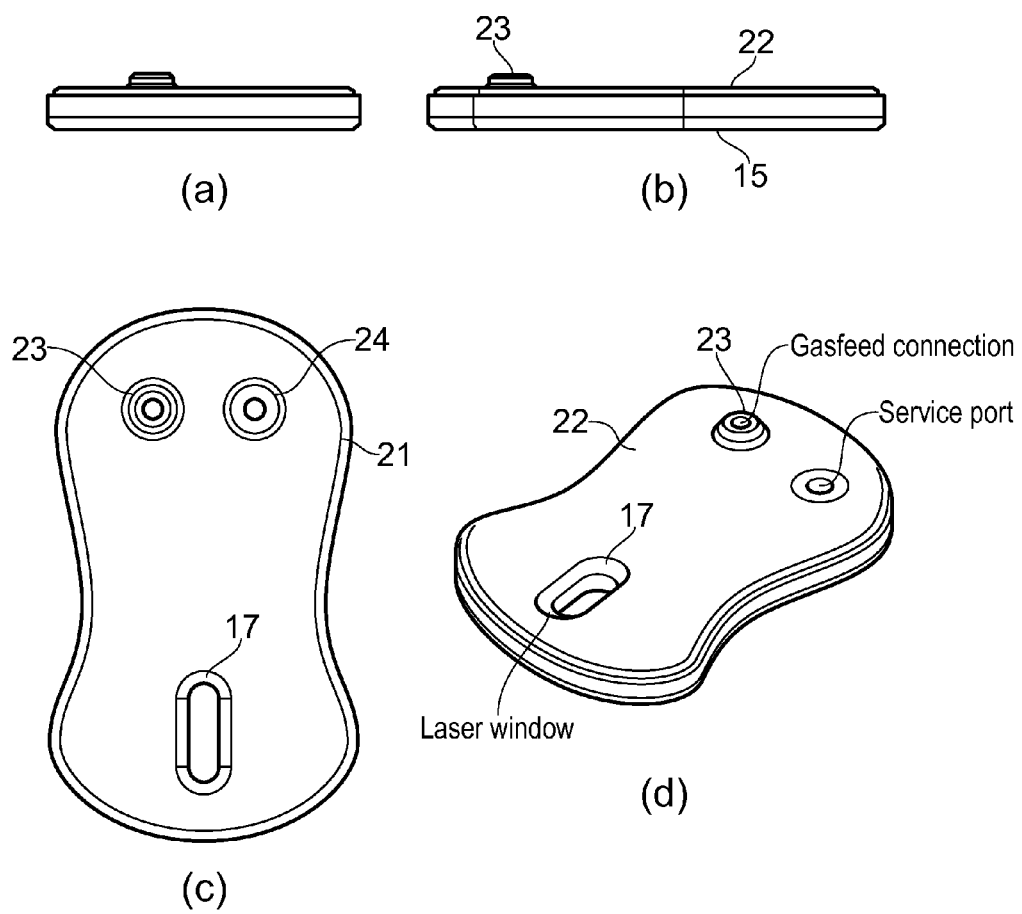

A schematic diagram of the fuel cartridge 20 is shown in FIG. 2. The cartridge 20 includes an outer peripheral edge 21 that approximately confirms to the profile of the upper housing portion and defines the shape of the mouse. The cartridge 20 includes an upper surface 22 which includes a gas feed connection 23 and a service port 24. The upper surface 22 engages with the upper housing portion 2 in any suitable manner, such as by push-fit or by a mechanical locking or latching arrangement (not shown). The gas feed connection 23 is configured to mate with a suitable valve on the underside of the upper housing portion 2 for conveying fluid fuel to the fuel cell. The service port 24 may provide additional functionality, e.g. for refilling/purging/cleaning cartridges.

FIG. 3 shows a perspective view of the fuel cell mouse 1 with the fuel cartridge connected (FIG. 3b) and disconnected (FIG. 3a). It can be seen that the detachable fuel cartridge 20 itself effectively comprises at least a portion of the external part of the housing and thereby serves as a functional base of the mouse, e.g. in providing the low friction sliding surface and the optical emission portion of the mouse, or housing at least part of any tracker ball mechanism. Removal of the fuel cartridge for replacement or replenishment may also enable servicing of the internal components of the mouse, or cleaning of the low friction surfaces. In a general aspect, a position sensing means exemplified by an optical tracker system or a mechanical tracking ball may be configured to sense changes in position of the mouse relative to a support surface on which the mouse is to be used, and may operate through the aperture in the fuel cartridge.

Computer mice are typically designed to be of a certain size for optimal use by the human hand. As such, they typically have a significant amount of empty space within the housing. This makes it particularly advantageous to use some of this space to provide an additional power source, since the space is otherwise wasted.

Figure 4:
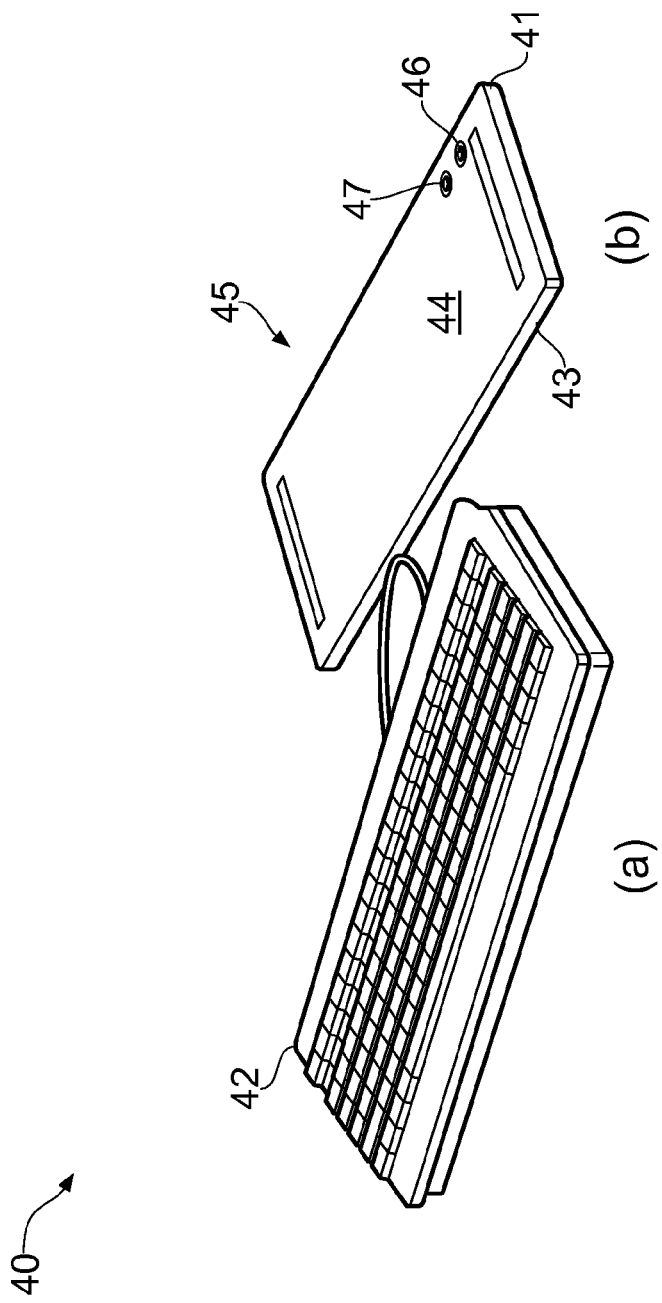
FIG. 4a shows a perspective view of a computer keyboard incorporating a fuel cell with fuel cartridge attached.
FIG. 4b shows a perspective view of the fuel cartridge detached.

An alternative peripheral device could be a keyboard. FIG. 4 shows a keyboard 40 in which a fuel cell system is incorporated. The computer keyboard 40 includes an upper housing portion 42 which encases conventional mechanical and electronic hardware for performing the conventional keyboard functionality. The upper housing portion 42 includes a set of conventional keyboard keys together with any other control switches, buttons, or other control surfaces as known in the art.

Incorporated within the upper housing portion 42 is a fuel cell (not visible in FIG. 4). The fuel cell may be of any suitable type as discussed in connection with the mouse of FIG. 1. The upper housing portion 42 also includes a number of ventilation hole arrays (not shown) to provide ventilation to the fuel cell, e.g. an air source to the cathode side of a fuel cell. These ventilation hole arrays are preferably positioned on the upper housing portion 42 in positions where there is reduced likelihood that they will be occluded by a user's hand during normal operation of the keyboard.

The base 41 of the keyboard 40 preferably provides a substantially planar lower surface for providing a stable keyboard support and may include feet or adjustable legs for varying the height and/or tilt of the keyboard upper surface. The base 41 serves as a removable fuel cartridge 45 to supply the fuel cell in the keyboard upper housing portion 42 with a suitable fluid fuel, as described previously in connection with the mouse of FIG. 1.

The fuel cartridge 45 is preferably configured to be integrated into the overall profile of the keyboard housing, though preferably detachable to enable easy fuel replenishment and cartridge refilling. The fuel cartridge 45 includes an outer peripheral edge 43 that approximately conforms to the profile of the upper housing portion 42 and defines the shape of the keyboard. The cartridge 45 includes an upper surface 44 which includes a gas feed connection 46 and a service port 47. The upper surface 44 engages with the upper housing portion 42 in any suitable manner, such as by push-fit or by a mechanical locking arrangement (not shown). The gas feed connection 46 is configured to mate with a suitable valve on the underside of the upper housing portion 42 for conveying fluid fuel to the fuel cell. The service port 47 may provide additional functionality, e.g. for refilling/purging/cleaning cartridges.

Keyboards are typically designed to be of a certain size for optimal use by human hands. As such, they typically have a significant amount of empty space within the housing. This makes it particularly advantageous to use some of this space to provide an additional power source, since the space is otherwise wasted.

Other forms of peripheral device such as scanners, printers, projectors, docking station/stands may also be configured to have a fuel cell and cartridge incorporated therein in similar manner.

A particular benefit of providing a peripheral device, such as a computer mouse, with a fuel cell power source is that the fuel cell can be used not only to power the peripheral device itself, but also to power the computer device when connected thereto. A mouse, keyboard, printer or the like is conventionally connected to a portable computer device by way of a USB, or other similar, electrical connector. The USB or other connector conventionally provides a bus for data transfer between the computer device and the peripheral and also a power line for transferring power from the computer to the peripheral device to power the peripheral device. In one aspect, the present invention recognizes that there is considerable advantage in enabling a reverse power transfer to take place. In other words, the peripheral device with an on-board fuel cell can be used to provide power to the computer device. Thus, the battery life of the computer device can be extended by avoiding or reducing power drain on the computer battery when the peripheral device is connected thereto. Still further, the peripheral device could also be used to recharge the portable computer device when the peripheral is connected thereto. The peripheral device can be used to recharge the portable computer device when it is switched on or off. The peripheral device can be used to power, or to power and recharge, the portable computer device when it is switched on.

Figure 6:
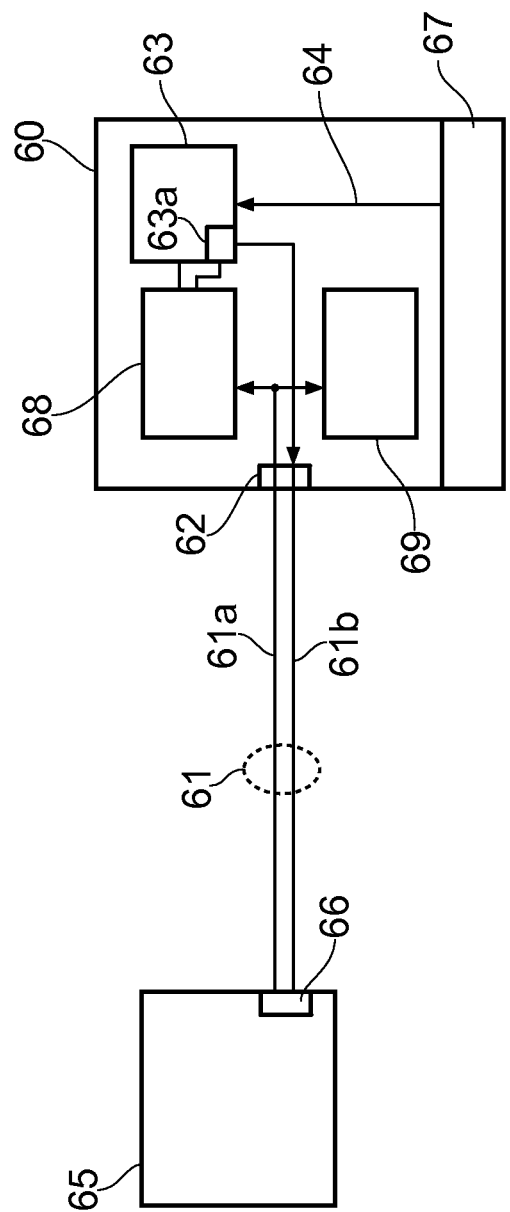
FIG. 6 shows a schematic block diagram illustrating functionality of a computer device and fuel cell enabled peripheral device.

A preferred arrangement is shown schematically in FIG. 6. A peripheral device 60 is connected to a computer device 65 by way of a USB or similar multifunction (i.e. power and data) cable 61. The computer device 65 includes an interface 66 for connecting both data and power connectors. These can be combined in a USB type connector, or be separate data and power connectors. A similar interface 62 is provided on the peripheral device 60. Fuel cell 63 is connected by fuel line 64 to a fuel cartridge 67. A data interface 68 provides for data transfer to and/or from the computer device 65. Computer peripheral functionality of the peripheral device (e.g. mouse functionality, printer functionality, keyboard functionality etc) is provided by circuitry depicted by the functional block 69. A power controller 63$a$ may supply power from the fuel cell 63 to the interface 62 for supply to the computer device 65 via a power line 61$b$.

The power transfer from peripheral device 60 to computer device 65 can be managed intelligently by using two-way data transfer between the computer device 65 and the peripheral device 60 on a data line 61$a$ under the control of data interface 68. Thus, the peripheral device 60 may be configured to indicate, to the computer device 65, that fuel cell power is available. In such a circumstance, the computer device 65 may be configured to detect whether it has mains power or is running on batteries. If the computer device has mains power available, it may elect to not demand power from the peripheral device, and may supply power to the peripheral device so that the fuel cell 63 therein may remain inactive or quiescent. If the computer device does not have mains power available, it may elect to demand power from the peripheral device, e.g. sufficient for full normal operation, or sufficient for assistance to battery operation (to extend battery life), or for battery recharge, or combinations thereof.

The power is preferably delivered from the peripheral device 60 to the computer device 65 using a common data communication/power lead 61, such as USB or USB-OTG. However, for backward compatibility with existing hardware or standards, it may be preferable to have separate electrical connectors for data (e.g. USB) and power (e.g. a conventional or proprietary power plug). Separate electrical connector plugs may be provided on the end of a common multicore cable to the peripheral device for user convenience. For example, the computer mouse 1 could be provided with a lead 30 (FIG. 3) which terminates in a junction and split cable pair respectively terminating in a USB plug and a power plug.

Data communication between the computer device and the peripheral device could alternatively be provided by a wireless communication channel such as infrared or Bluetooth. Power communication between the peripheral device and the computer device could alternatively be provided by a wireless technology such as inductive transfer of power. This latter aspect could be of particular advantage when the peripheral device and the computer device are placed in close proximity to one another.

Figure 5:
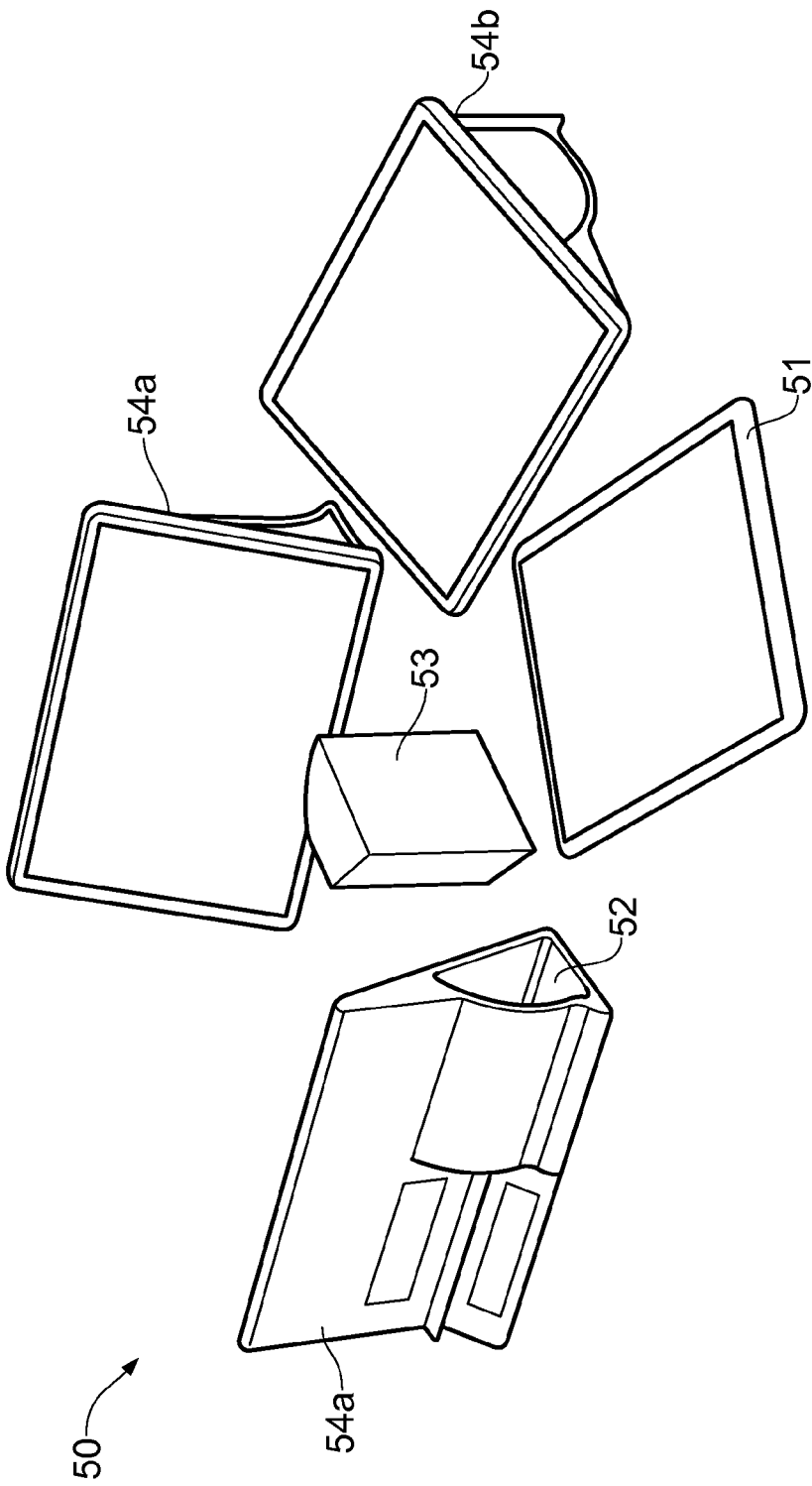
FIG. 5 shows a tablet computer support stand from several perspective viewpoints with an integrated fuel cell and detachable fuel cartridge.

In another arrangement shown in FIG. 5, a docking station/ stand 50 for a tablet computer 51 is shown. A fuel cell (not shown) is incorporated into the docking station/stand. The stand 50 also includes a receptacle 52 for a fuel cartridge 53. The stand 52 may have a triangular design to provide for at least two different orientations of use, as shown respectively where indicated by 54a and 54b. These two orientations can allow the stand to serve as a reading and typing plinth. The stand may comprise a hinged arrangement for altering the angle of presentation of the tablet computer 51. The receptacle 52 for receiving a fuel cartridge 53 may be a recess or hole as shown in FIG. 5 into which the cartridge may be inserted. Alternatively, the fuel cartridge could be attached to and form a part of the base of the docking station/stand in a similar way to that described in connection with the mouse and keyboard embodiments described above.

A docking station/stand is conventionally of a size that is at least partly determined by the size of the tablet computer being attached thereto and thus typically has a significant amount of empty space within the housing. This makes it particularly advantageous to use some of this space to provide an additional power source, since the space is otherwise wasted.

The docking station/stand may be connected to a computer device (tablet) by way of a USB or similar multifunction (i.e. power and data) cable as described above. More preferably, the cable would be replaced by a set of connectors on the side or base of the tablet which automatically connect to complementary connectors on the docking station/stand when the tablet is mounted thereto. The close proximity of the tablet computer device to the docking station/stand also makes the possibility of wireless power and data transfer easier and potentially advantageous. Power transfer between the tablet computer and the docking station/stand can be managed intelligently by using two-way data transfer as described earlier in connection with the mouse and keyboard arrangements.

Figure 7:
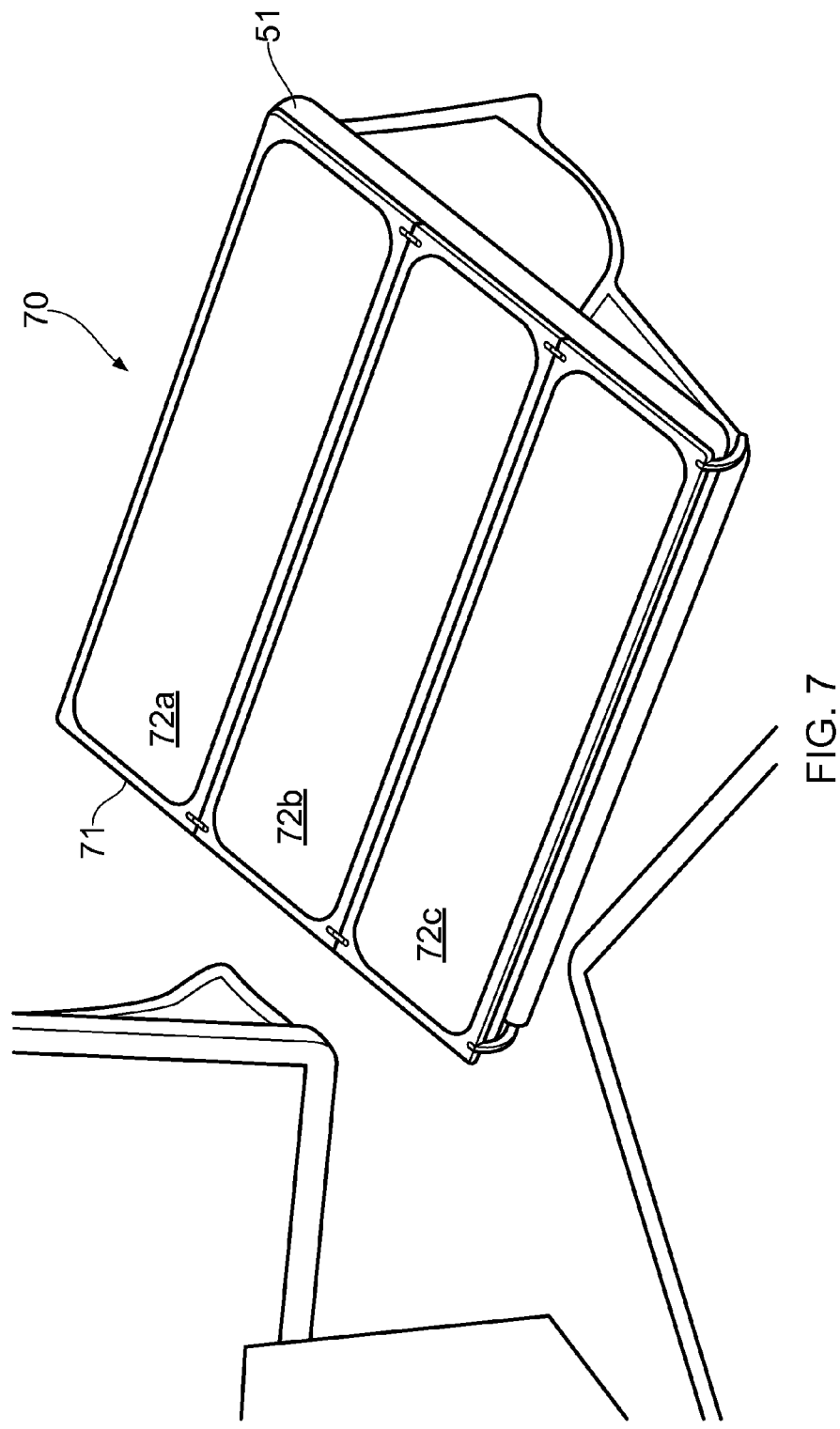
FIG. 7 shows a docking station/stand with a photovoltaic panel.

In a further arrangement, as shown in FIG. 7, the docking station/stand 70 may include a photovoltaic panel 71 as a supplementary power source for charging a tablet computer device 51 thereon. The photovoltaic panel 71 may be configured as a folding series of panels 72a, 72b, 72c which can unfold over a tablet computer device 51 when it is not in use. Charging power can be routed to the tablet 51 via the docking station/stand 70, and from there to the tablet 51 using the same power delivery mechanism as used for a fuel cell incorporated into the docking station/stand 70. In a more general aspect, the docking station/stand 70 may incorporate a number of photovoltaic cells disposed on any convenient surface of the docking station/stand 70 which can be used as an alternative or additional power source to the fuel cell, either for standby charging when a tablet is not in use, or an auxiliary power source when the tablet is in use. A switching mechanism (not shown) could be incorporated into the docking station/stand 70 which switching mechanism is triggered by folding back the photovoltaic panels 72 for use of the tablet computer device 51. The switching mechanism may switch on the fuel cell in readiness for powering the tablet computer device 51. The tablet computer device 51 might also be automatically powered up when the photovoltaic panels 72 are folded back. The switching mechanism could be a magnetic switch, a microswitch, a proximity switch, optical sensor, for example.

All of the embodiments described above of a significant advantage that the battery life of a portable computer device can be extended without necessarily increasing battery size and/or performance by the expedient location of a fuel cell power system in a peripheral device such as a mouse or docking station/stand that may be commonly also used by the person carrying the portable device. Such a peripheral may, without any action required of the user, intelligently supplement the power available to the portable device to provide full or partial operating power and/or recharging power.

Other embodiments are intentionally within the scope of the accompanying claims.

The invention claimed is:

1. A computer peripheral device comprising:
a housing having a base;
circuitry within the housing to provide at least one computer peripheral function;
a data interface for providing data transfer to and/or from a computer device;
a fuel cell power source incorporated into the computer peripheral device;
a detachable fuel cartridge for supplying fuel to the fuel cell, the fuel cartridge operably coupled to the base of the housing;
a power interface for providing power transfer to the computer device when connected thereto; and
a power controller configured to supply power from the fuel cell power source to the power interface for supplying said power to said computer device when connected thereto, wherein the computer peripheral device comprises a mouse, a printer, a scanner, a keyboard, or a projector; and
wherein the detachable fuel cartridge, when coupled to the base of the housing, defines the base of the computer peripheral device.

2. The computer peripheral device of claim 1 in which the data interface and power interface comprise a USB interface.

3. The computer peripheral device of claim 1 further including a controller configured to control operation of the fuel cell power source according to instructions received from the computer device via said data interface.

4. The computer peripheral device of claim 1 in which the device comprises a mouse, the mouse further comprising:
a position sensing means for sensing changes in position of the mouse relative to a support surface on which the mouse is to be used,
such that the fuel cartridge has a lower surface for sliding engagement with said support surface, and
the fuel cartridge has at least one aperture through which the position sensing means operates.

5. The computer peripheral device of claim 4 in which the cartridge includes low friction pads on the lower surface thereof.

6. The computer peripheral device of claim 1 in which the device comprises a keyboard in which the detachable fuel cartridge defines the base of the keyboard, the fuel cartridge having a lower surface for engagement with a support surface on which the keyboard is to be used, and the fuel cartridge being configured to provide an adjustable support for the keyboard when in use.

7. The computer peripheral device of claim 1, in which the device comprises a printer.

8. The computer peripheral device of claim 1, in which the device comprises a scanner.

9. The computer peripheral device of claim 1, in which the device comprises a projector.

* * * * *